2,761,207
METHOD OF MAKING A COMPOSITE METAL ROD

Clinton R. Dodd, Chatham, Thomas P. Hartnett, Shrewsbury, and Harold Robinson, Union, N. J., assignors to Baker & Company, Inc., Newark, N. J., a corporation of New Jersey No Drawing. Application March 16, 1955,
Serial No. 494,810

2 Claims. (Cl. 29—474.3)

The present invention deals with the method of making a composite metal rod and particularly with the method of making a composite metal rod especially suitable for use as an electrode structure for space discharge devices.

In space discharge devices employing hot electron emissive cathodes of the activated type, e. g. thoriated cathodes, in conjunction with electrodes or grids of a refractory material, e. g. tungsten, tantalum, and molybdenum, which must be essentially free of activative material, it has been found that the grids suffer from contamination by the activation material and lose stability unless protected by an electron emission inhibiting material. Generally, the electrodes are coated with an electron emissive inhibiting metal comprising a coating of at least one of the platinum metals, especially platinum. The platinum coating on the refractory base metals above mentioned is provided by several methods which usually employ electrodeposition of the platinum metal on the base metal. While other methods have been proposed which incorporate the hammering, welding, and rolling techniques, none of these known methods have been found to be satisfactory since they do not produce a coat of platinum metal which adheres with sufficient tenacity to the refractory metal for use of the composite material as a grid structure, especially under the operating conditions to which space discharge grids are subjected.

On the other hand, an electrolytically deposited platinum layer directly on a refractory metal also has disadvantages in that the platinum layer is subject to blistering or separating with respect to the refarctory core.

It is an object of the present invention to provide a method of making a composite metal rod composed of a refractory metal core with a platinum group metal coating. It is another object of the present invention to provide a method of coating a refractory metal with a platinum layer. It is a further object of this invention to provide a method whereby a refractory metal body is coated with a platinum layer and which resists contamination by an activation material when employed as an electrode in a space discharge device. Other objects and advantages of this invention will become apparent from the description hereafter following.

The present invention relates to the method of making a composite rod of a refractory metal such as tungsten, tantalum, and molybdenum coated with a layer of a platinum group metal, especially platinum, whereby the platinum layer is in the form of a tube and telescoped over the refractory rod, and whereby a series of critically controlled fabrication steps are employed to insure a strong bond between the platinum sheath and the refractory core.

Prior to telescoping the platinum sheath onto the refractory rod, e. g. a tungsten rod, the rod is first anodized in an aqueous solution containing between about 25 to 75 grams per liter of sodium hydroxide and between about 10 to 20 grams per liter of sodium cyanide. For example, the aqueous solution contains 50 grams per liter of sodium hydroxide and 15 grams per liter of sodium cyanide, and in which solution the rod is immersed for three minutes at a current density of 2 amps./sq. in. with the temperature of the aqueous solution being between 20° C.–50° C. This treatment dissolves the tungsten surface and thoroughly removes all contaminants.

The inner surface of the platinum sheath is etched with aqua regia.

Having treated the platinum sheath and the tungsten rod as hereinabove described, the rod is telescoped into the platinum sheath with one end of the sheath projecting beyond and end of the tungsten rod. For example, a rod with a diameter of .250 in. is inserted into a platinum tube having an inside diameter of .265 in. and a wall thickness of .016 in. to give a 23.1% platinum to tungsten ratio and the tube being about 1 in. to 1½ in. longer than the rod, with the rod and tube being matched on one end. Only the extending portion of the tube is swaged to provide a reduced end to be passed through a fitting die. Because of the brittle nature of the tungsten, it is imperative that swage pointing and draw bench gripping be done only on the platinum extension and not on the composite section. Having provided a reduced swaged end, the composite rod is pulled through a first die, or fitting die, by means of the platinum extension, whereby the platinum tube is snug-fitted onto the tungsten rod without any cold working of the tungsten. In short, only the platinum sheath is reduced in diameter in the first die operation. Having snug-fitted the platinum tube onto the tungsten rod, the excess length of the platinum tube is removed. Following the snug-fitting operation, the composite rod is hot swaged in a water-cooled hot swaging apparatus. In the swaging process the composite rod is repeatedly progressively reduced in diameter with attendant reductions in temperature at each progressively reduced stage. The hot swaging apparatus employs a series of reducing dies for progressively reducing the cross-sectional area of the composite rod at from 10% to 20% reduction stages. The following tabulation shows an example of a series die diameters with the attendant temperatures employed during the progressive reducing operation:

| Die diameter: | Composite rod temperature, ° C. |
|---|---|
| .225" | 1330 |
| .228" | 1300 |
| .204" | 1280 |
| .182" | 1250 |
| .163" | 1220 |
| .146" | 1190 |
| .131" | 1170 |
| .117" | 1160 |
| .105" | 1150˙ |
| .094" | 1140 |
| .084" | 1130 |
| .075" | 1120 |
| .067" | 1110 |
| .060" | 1100 |

Having reached a predetermined state in cross-sectional area reduction, the wire is then subjected to a wire drawing procedure wherein the wire dies are heated and the wire is lubricated during progressively reducing drawing operations with attendant progressively reduced temperatures at each progressively reduced stage.

It has been found that with the procedure hereinbefore described, in conjunction with the particular etching of the rod and tube prior to swaging and drawing, the platinum coating on the refractory metal core will adhere under space discharge lamp conditions, when the rod or wire in its finally reduced form is employed as an electrode in space discharge lamps.

The invention is not intended to be limited to the particular examples included herein since some modification is possible within the scope of the appended claims.

What I claim is:

1. The method of making a composite metal rod comprising forming a refractory metal core and a platinum group metal sheath, anodizing the refractory core in an aqueous anodizing solution, etching the inner surface of the platinum group metal sheath, telescoping the core within the sheath leaving a portion of the sheath extending beyond the core, gripping the sheath extension and snug-fitting the sheath onto the core, removing the sheath extension and hot swaging the composite rod with progressive reduction of the cross-sectional area of the composite rod under progressively reduced temperatures.

2. The method of making a composite metal rod comprising forming a refractory metal core and a platinum group metal tube, anodizing the refractory core in an aqueous anodizing solution, etching the inner surface of the tube with aqua regia, telescoping the core within the tube leaving a portion of the tube extending beyond the core, gripping the tube extension and snug-fitting the tube onto the core, removing the tube extension and hot swaging the composite rod into wire with progressive cross-sectional area reduction stages under progressively reduced temperature stages, and further reducing the cross-sectional area of the wire with progressively reducing hot drawing stages, lubricating the wire during drawing and progressively reducing the drawing temperatures of the wire.

References Cited in the file of this patent

UNITED STATES PATENTS 2,719,797     Rosenblatt et al.     Oct. 4, 1955

FOREIGN PATENTS 434,192     Great Britain     Aug. 28, 1935